(12) United States Patent
Engle et al.

(10) Patent No.: US 6,810,569 B1
(45) Date of Patent: Nov. 2, 2004

(54) WORKPIECE RELEASE WITH COMPUTER VERIFIED CONNECTIONS

(75) Inventors: Brian Engle, Armada, MI (US); Harold E. Cunningham, Oxford, MI (US); Larry D. Land, Grosse Ile, MI (US); James F. Potter, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/614,999

(22) Filed: Jul. 8, 2003

(51) Int. Cl.[7] ............................................. G01M 19/00
(52) U.S. Cl. ..................... 29/407.04; 29/701; 29/705; 29/709; 285/319; 285/93; 285/305; 285/921
(58) Field of Search ................... 29/407.01, 407.04, 29/890.14, 890.145, 428, 701, 705, 709; 285/319, 93, 305, 921

(56) References Cited

U.S. PATENT DOCUMENTS

| | | | |
|---|---|---|---|
| 2,661,768 A | | 12/1953 | Novak et al. |
| 4,925,217 A | * | 5/1990 | Ketcham ..................... 285/93 |
| 4,977,935 A | | 12/1990 | Durkee, Jr. et al. |
| 5,038,023 A | | 8/1991 | Saliga |
| 5,152,555 A | | 10/1992 | Szabo |
| 5,178,424 A | * | 1/1993 | Klinger ..................... 285/319 |
| 5,257,548 A | | 11/1993 | Pardy |
| 5,441,313 A | * | 8/1995 | Kalahasthy ................. 285/93 |
| 5,676,403 A | | 10/1997 | Klinger et al. |
| 5,897,145 A | | 4/1999 | Kondo et al. |
| 6,082,779 A | | 7/2000 | Lesser et al. |
| 6,145,886 A | | 11/2000 | Ohta et al. |
| 6,161,877 A | | 12/2000 | Le et al. |
| 6,234,544 B1 | * | 5/2001 | Bartholomew .............. 285/319 |
| 6,293,596 B1 | | 9/2001 | Kinder |
| 6,328,344 B1 | | 12/2001 | Tozaki et al. |

* cited by examiner

*Primary Examiner*—David P. Bryant
*Assistant Examiner*—Stephe Kenny
(74) *Attorney, Agent, or Firm*—Brinks Hofer Gilson & Lione

(57) ABSTRACT

A method for manufacturing a workpiece, such as an automotive fuel tank, that includes a connection between a male connector and a female connector, one of which includes a tab that is only removable following the connection. The tab includes a computer-readable code that is read by the computer. During manufacturing, the workpiece is loaded into a workstation, the connection is made, and the tab is removed. The tab is presented to a computer to verify the connection. In the event that a command is received to release the workpiece and the computer has not verified the connection, the computer issues an alert. In a workstation that comprises a computer-controlled release mechanism, a preferred alert comprises a refusal to release the workpiece prior to verification of the connection.

14 Claims, 1 Drawing Sheet

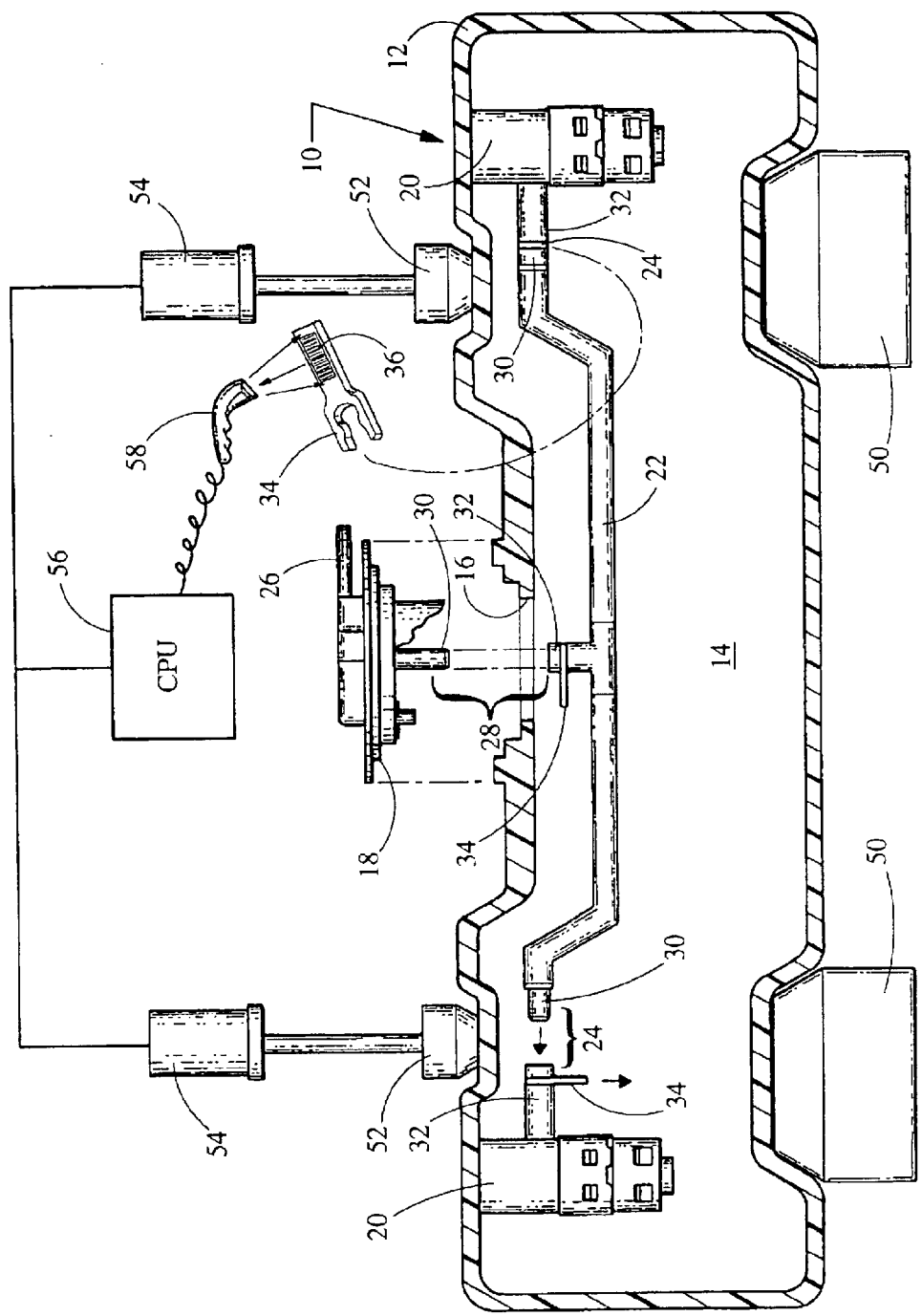

WORKPIECE RELEASE WITH COMPUTER VERIFIED CONNECTIONS

TECHNICAL FIELD OF THE INVENTION

This invention relates to manufacture of a workpiece, such as an automotive fuel tank, that includes blind quick connections. More particularly, this invention relates to such manufacture wherein the connectors include a tab that is removed following proper connection and includes a code read by a computer prior to release of the workpiece.

BACKGROUND OF THE INVENTION

It is often necessary to manufacture a workpiece that includes a connection in a location that cannot be readily inspected, referred to as blind connections. For example, in the manufacture of an automotive fuel tank, following formation of the shell, connections may be made through an opening in the shell to vent valves or other internal components that are remote from the opening. Also, connections are made to the inner side of the flange that seals the opening. Since the connections cannot be readily inspected by an operator, it is known to provide a tab attached to the female connector that is released only after proper connection to the male connector. The operator assembles the connectors and removes the tab to verify that the connection has been properly made. Nevertheless, instances occur where an operator, performing multiple tasks at the work station, fails to confirm that all connections have been properly made prior to release of the workpiece.

Therefore, a need exists for a method for manufacturing a workpiece that includes an alert when a blind connection has not been verified. Since visual inspection will not detect an improper connection, it is only noticed after release and subsequent processing, that is, following installation in a vehicle, and is not readily repaired except by replacement of the fuel tank. Thus, it is desired to take corrective measures to verify the connection before the workpiece is released for subsequent processing.

SUMMARY OF THE INVENTION

In accordance with this invention, a method is provided for manufacturing a workpiece that includes a connection between a male connector and a female connector. A tab is attached to one of the connectors in a manner that prevents the tab from being released prior to proper connection and is readily removed following proper connection. In accordance with this invention, the tab includes a computer-readable code, the workpiece is loaded into a workstation, and the connection is made by an operator, who removes the tab. The tab is presented to a computer to scan the computer-readable code to verify that the connection has been properly made and the tab has been removed. In the event that a command to release the workpiece from the workstation is received and the computer has not identified the code, the computer issues an alert. In a preferred embodiment, the workstation comprises a fixture that is controlled by the computer, and the workpiece is not released from the workstation by the computer unless the connection has been verified. Alternately, the computer may actuate a sound or light to prompt the operator to take corrective action. Thus, the method of this invention provides computer verification that a proper connection has been made and the tab removed. In manufacturing operations that require multiple tasks at the workstation, the method assists the operator by assuring that all necessary connections have been made before release of the workpiece from the workstation. It is also an advantage of this invention that the method allows a computer record to be made that is associated with the unique serial number of the workpiece, for example, a fuel tank, to prevent the fuel tank from being installed onto an automotive vehicle with improper connections.

BRIEF DESCRIPTION OF THE DRAWINGS

This invention will be further described with reference to the drawings wherein:

FIG. 1 is a schematic view of a manufacturing operation of an automotive fuel tank in accordance with this invention.

DETAILED DESCRIPTION OF THE INVENTION

In accordance with a preferred embodiment of this invention, referring to the FIGURE, this invention provides an improved method for manufacturing a fuel tank assembly 10 for an automotive vehicle. Fuel tank assembly 10 comprises a shell 12 that encloses an interior 14. A suitable shell comprises multiple polymeric layers, the outer most of which is formed by thermal forming polymeric sheets and seam welding the sheets into a singular body. Alternatively, the shell may be made by blow molding or may be formed of metal. Once formed, access to interior 14 is limited to a single opening 16 that is subsequently sealed by a flange 18 that provides connections to the fuel pump and other in-tank components. In this example, assembly 10 includes vent valves 20 mounted within the interior 14 remote from opening 16. Vent valves 20 are connected to an internal vent line 22 through connections 24. It is a significant feature of this invention that connections 24 are located remote from opening 16 and are not readily accessible for visual inspection. Vent line 22 is connected to an external vent line 26 through connection 28 through flange 18. Connection 28 is made to a connector on the inner side of flange 18, so that the connection is also not readily accessible for visual inspection. External vent line 26 is connected to a vapor purge canister that stores excess vapors generated within fuel tank 10 during use to prevent excessive pressure build up in the tank.

In accordance with this invention, connections 24 and 28 are made by a quick connect assembly that comprises a male connector 30 that is inserted into a female connector 32. In a preferred embodiment, female connector 32 includes a tab 34 that is attached to the female connector prior to connection. Tab 34 includes tangs that extend through slots in the female connector to secure the tab. When the male connector is inserted into the female connector properly, the male connector deforms the tangs to release the tab. An operator is then able to remove the tab to verify that a proper connection has been made. This is accomplished by the operator reaching an arm through opening 16 to the connection, locating the tab by tactile inspection, gripping the tab and removing the tab through the opening. By way of one example, a suitable quick connect assembly that includes a removable tab is described in U.S. Pat. No. 5,152,555 issued to Szabo in 1992.

In accordance with this invention, tab 34 includes a computer scanable code 36. The preferred code is a bar code that is readable by a scanner 58 the provides electrical signals to a computer 50 for analyses. Alternately, code 36 may be suitably alphanumeric or other symbols, and the computer may include an imaging device. In still another alternative, code 36 may be a magnetic code that is suitable read by a magnetic code reader.

In a preferred embodiment, the code corresponds to a serial number that is unique to the component to which the female connector is attached. It is common practice to assign a serial number to the fuel tank assembly for purposes of tracking the assembly during manufacture and installation. Each component, for example, each vent valve 20, may also be assigned a serial number, and the serial number recorded when the component is installed in the fuel tank assembly in a data base that correlates the serial number of the component and the serial number of the fuel tank assembly. By recording the serial number onto the removable tab, the tab is uniquely identified with the component, and its removal evidences a proper connection at the known location. Alternately, codes may be utilized that identify the component generally, or represent a random number selected from a list of acceptable codes.

The manufacture of fuel tank assembly 10 with encoded tabs 34 will now be described. A fuel tank assembly 10 that includes a shell 12 and vent valves 20 is delivered to a work station that includes a stationary fixture 50 and a moveable fixture 52 actuated by pneumatic cylinders 54. Cylinders 54 are monitored by a computer 56 to clamp assembly 10 between fixtures 50 and 52. An operator then installs internal vent line 22 by making connections 24 to vent valves 20. Vent line 22 includes male connectors 30 that are inserted into female connectors 32 on vent valves 20. Access to vent valves 20 is provided to the operator through opening 16. The operator grips each male connector 30 and inserts the male connector into the corresponding female connector 32. The operator relies on tactile sense for locating the female connector, since the size of the opening and the location of the vent valve prevents visual inspection. Upon successfully inserting male connector 30 into female connector 32, tab 34 is released from the connection 24. The operator locates the tab 34, again relying on tactile sense, and removes the tab through opening 16. Following removal of the tab, the operator presents the tab to scanner 58, which images code 36 and delivers the coded image to computer 56. The computer analyzes the code, identifies the coded symbol, and records that the tab has been removed. Because the tab is only releasable following proper connection, computer identification of the tab verifies that the connection has been completed. In this example, the operator, then installs flange 18 at the workstation, which includes a male connection for coupling to a female connection on vent line 22. The operator completes connection 28 and removes the associated tab, and presents the tab to scanner 58. The operator may complete additional tasks as required at the workstation.

Upon completing all tasks, the operator signals for release of the fuel tank assembly.

When the computer receives a command to release the fuel tank assembly from the workstation, the computer confirms that the codes for the tabs for all internal connections have been reported, and thus verifies that all connections have been completed. In the event that the computer determines that one or more connections have not been verified, the computer issues an alert. In the preferred embodiment, the alert includes a refusal to actuate the fixture to release the fuel tank assembly from the workstation. The operator is thus made aware that the fuel tank assembly is not ready to release, thereby prompting the operator to take corrective action. The computer may include a display, such as a computer screen or a board with indicator lights, to inform the operator of the unverified connection. Upon confirmation, computer 56 actuates pneumatic cylinders 54 to withdraw fixture 52 and release the fuel tank assembly from the workstation. While in the preferred embodiment, the computer alerts the operator by refusing to the release a fuel tank with an unverified connection, other types of alerts may be issued, particularly in manufacturing operations where the fixture is not actuated by the computer. In an example, the computer may actuate a sound or light to alert the operator. Alternatively, the computer may issue a report to permit the fuel tank assembly to be identified or repaired at a subsequent time, for example, prior to testing or installation. Upon confirmation, computer 56 actuates pneumatic cylinders 54 to withdraw fixture 52 and release the fuel tank assembly from the workstation.

Therefore, this invention provides a method for manufacturing a workpiece that includes internal connections between a male connector and a female connector. The connectors include a tab that is only removable following a proper connection and includes a code identifiable by the computer. Removal of the tab from the connection thus provides a first verification that the connection has been properly completed, while reporting of the code to the computer provides a further verification that the connection has been completed. In the event that connections have not been properly completed, the operator is alerted to take corrective measure. Preferably, the operator is alerted to take corrective action while the workpiece is at the work station, thereby improving efficiency.

While this invention has been described in certain embodiments thereof, it is not intended to be so limited, but rather only to the extent set forth in the claims that follow.

What is claimed is:

1. A method of manufacturing a workpiece that includes a connection between a male connector and a female connector, said method comprising:

providing a tab attached to one of said male connector and said female connector and removable following making of the connection, said tab including a computer-readable code;

loading the workpiece into a workstation;

connecting the male connector and the female connector to complete the connection removing the tab from the connection; and presenting the tab to a computer to identify the computer-readable code to verify the connection;

said method further comprising issuing an alert when a command to release the workpiece from the workstation is received and the computer-readable code has not been identified.

2. A method in accordance with claim 1 wherein the tab is attached to the female connector and includes tangs that are deformed by the male connector to allow removal of the tab.

3. A method in accordance with claim 1 wherein the workstation includes a release mechanism that is controlled by the computer, and wherein the alert includes a failure to release the workpiece in response to the command.

4. A method in accordance with claim 1 wherein the alert comprises actuation of a sound or light.

5. A method in accordance with claim 1 wherein the alert comprises a report to allow the workpiece to be subsequently identified.

6. A method in accordance with claim 1 wherein the code is a bar code, and the computer includes a scanner for reading a bar code.

7. A method in accordance with claim 1 wherein the code comprises alphanumeric symbols, and the computer comprises an imaging device.

8. A method in accordance with claim 1 wherein the code is a magnetic code, and the computer comprises a magnetic code reader.

9. A method in accordance with claim 1 wherein the code corresponds to a serial number that identifies the connector.

10. A method for manufacturing a fuel tank for an automotive vehicle comprising a shell defining an interior and an opening, and component mounted within the interior remote from the opening, said component comprising a female connector, said method comprising:

providing a tab attached to the female connector, and removable following connection to a male connector, said tab having a computer-readable code;

loading the shell into a workstation having a release mechanism controlled by a computer;

while loaded into the workstation connecting a male connector to the female connector to complete a connection;

removing the tab from the connection;

presenting the tab to the computer to identify the computer-readable code and verify the connection; and releasing the fuel tank from the workstation only after verification of the connection by the computer.

11. A method in accordance with claim 10 wherein the computer-readable code is a bar code, and the computer comprises a scanner for reading a bar code.

12. A method in accordance with claim 10 wherein the computer-readable code is a serial number of the component.

13. A method in accordance with claim 10 wherein the component is a vent valve, and the fuel tank comprises a vent line that includes the male connector.

14. A method in accordance with claim 10 wherein the component is a vent line having one of said female connector and said male connector, and the fuel tank comprises a flange adapted to seal the opening and include the other of said female connector and male connector.

* * * * *